(12) United States Patent
Sakai et al.

(10) Patent No.: US 11,967,838 B2
(45) Date of Patent: Apr. 23, 2024

(54) AUXILIARY POWER RECEIVING DEVICE

(71) Applicant: TOYODA GOSEI CO., LTD., Kiyosu (JP)

(72) Inventors: Tomokazu Sakai, Kiyosu (JP); Shinichiro Fuki, Kiyosu (JP); Teppei Abe, Kiyosu (JP); Shigeo Takeda, Kiyosu (JP); Yuki Tokuyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/063,272

(22) Filed: Dec. 8, 2022

(65) Prior Publication Data

US 2023/0208207 A1    Jun. 29, 2023

(30) Foreign Application Priority Data

Dec. 23, 2021  (JP) .................................. 2021-209838

(51) Int. Cl.
*H02J 50/80* (2016.01)
*H02J 50/27* (2016.01)
*H02J 50/50* (2016.01)

(52) U.S. Cl.
CPC .............. *H02J 50/80* (2016.02); *H02J 50/27* (2016.02); *H02J 50/50* (2016.02)

(58) Field of Classification Search
CPC .............. H02J 50/27; H02J 50/50; H02J 50/80
See application file for complete search history.

(56) References Cited

U.S. PATENT DOCUMENTS

| | | | | |
|---|---|---|---|---|
| 2013/0335020 A1* | 12/2013 | Moore | .................. | H02J 7/0042 320/109 |
| 2014/0368048 A1* | 12/2014 | Leabman | ................. | H04B 5/79 307/104 |
| 2015/0162781 A1* | 6/2015 | Fratti | .................... | H02J 7/0013 320/101 |
| 2018/0323636 A1* | 11/2018 | Makwinski | ........... | H02J 7/0042 |
| 2019/0165608 A1* | 5/2019 | Hong | ..................... | H02J 50/12 |

FOREIGN PATENT DOCUMENTS

JP          2019-120627 A     7/2019

* cited by examiner

*Primary Examiner* — Hal Kaplan
*Assistant Examiner* — Joseph N Inge
(74) *Attorney, Agent, or Firm* — POSZ LAW GROUP, PLC

(57) ABSTRACT

An auxiliary power receiving device includes a power receiving unit, a notification unit, and a notification controlling unit. The power receiving unit receives power from a power transfer signal, which is used to supply power from a power transmitting device to a power receiving device. The notification unit may be provided on a main surface of a plate-shaped member. The notification controlling unit controls a notification performed by the notification unit in accordance with a power reception condition of the power transfer signal at the power receiving unit.

10 Claims, 4 Drawing Sheets

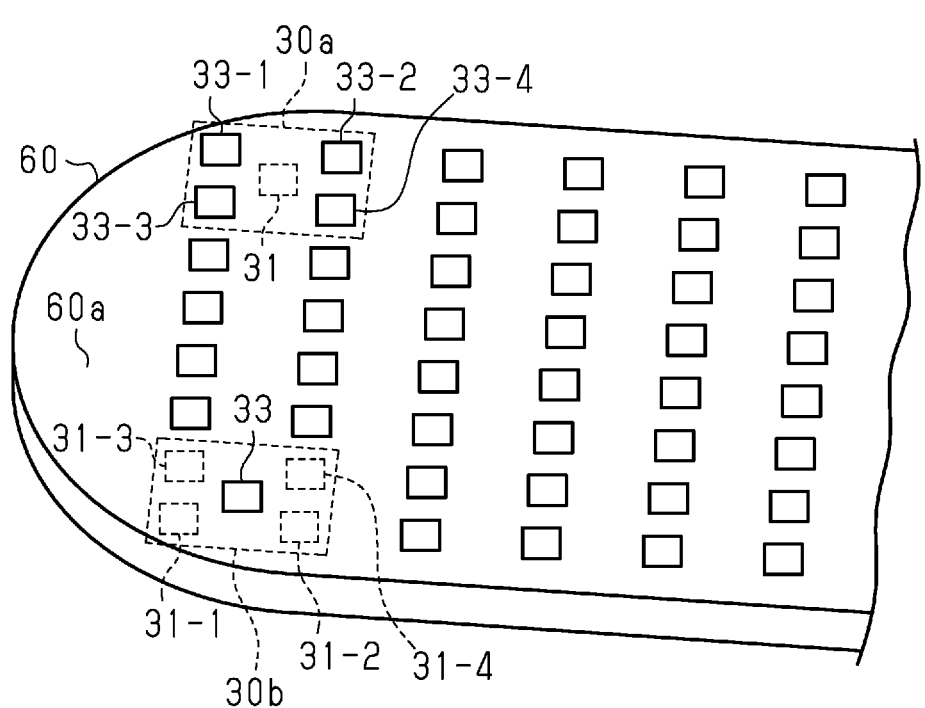

AUXILIARY POWER RECEIVING DEVICE

BACKGROUND

1. Field

The present disclosure relates to an auxiliary power receiving device.

2. Description of Related Art

In the related art, a coating material is applied to the surface of an irradiation target irradiated with a microwave and changes in color with an increase in temperature of the irradiation target due to the irradiation.

In a wireless power transfer using a microwave method for contactless power supply, the user may wish to visually recognize a power transfer signal such as a microwave. On the other hand, the output power of a power transfer signal used in wireless power transfer for contactless power supply may be reduced to a relatively low level in consideration of possible biological effects. However, in the related art, if a power transfer signal of which the output power is reduced to a relatively low level is used, the temperature increase of an irradiation target due to the irradiation of the power transfer signal is small. The user may be unable to recognize the presence of the power transfer signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an auxiliary power receiving device is provided that includes a power receiving unit, a notification unit, and a notification controlling unit. The power receiving unit is configured to receive power from a power transfer signal, which is used to supply power from a power transmitting device to a power receiving device. The notification unit is configured to be provided on a main surface of a plate-shaped member. The notification controlling unit is configured to control a notification performed by the notification unit in accordance with a power reception condition of the power transfer signal at the power receiving unit.

Other features and aspects will be apparent from the following detailed description, the drawings, and the claims.

BRIEF DESCRIPTION OF THE DRAWINGS

FIG. 7 is a diagram showing auxiliary power receiving devices of another configuration.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiments

Auxiliary power receiving devices 30 according to one embodiment will now be described with drawings.

[Overall Configuration of Contactless Power Supply System 1]

Figure 1:
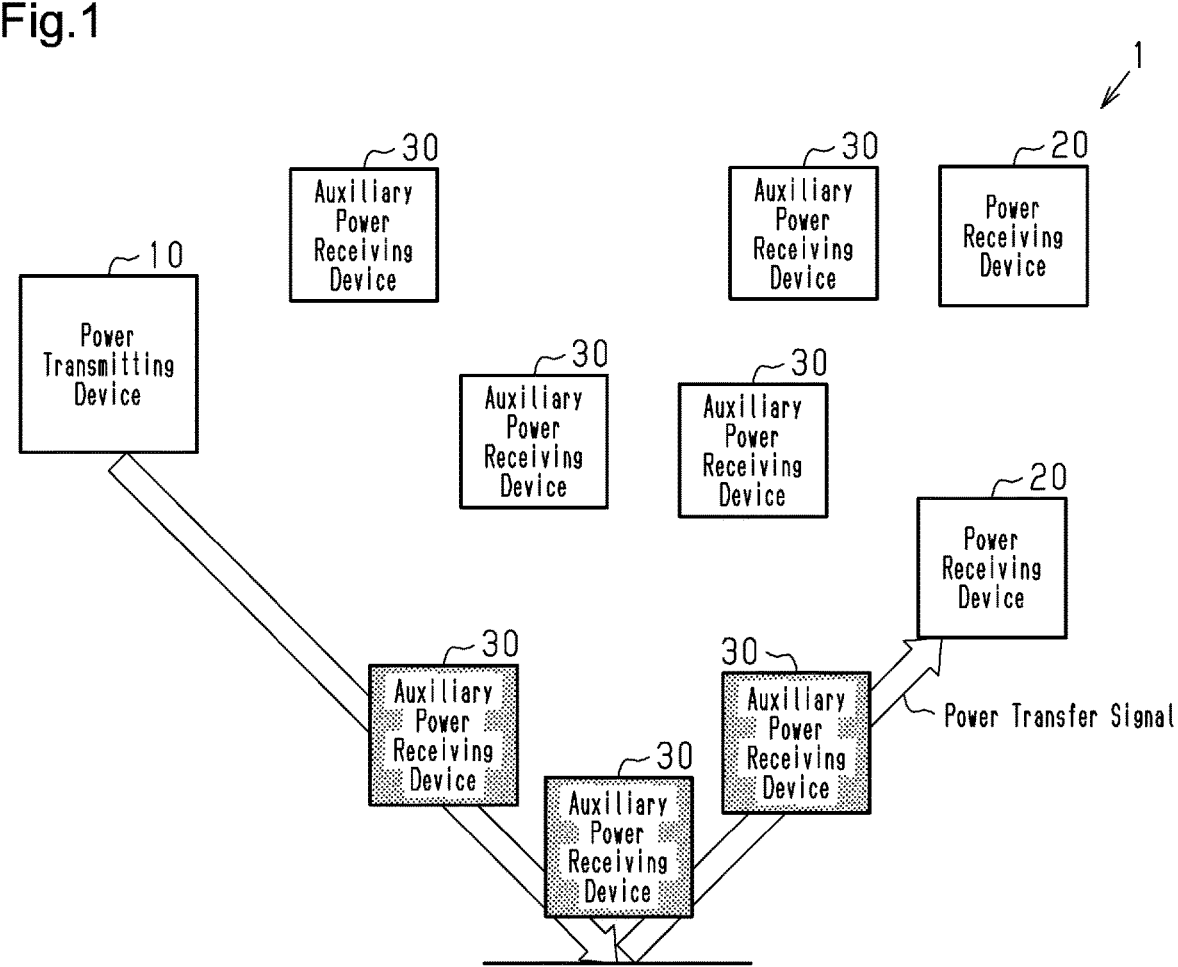
FIG. 1 is a diagram showing an overall configuration of a contactless power supply system.

As shown in FIG. 1, a contactless power supply system 1 includes a power transmitting device 10, power receiving devices 20, and auxiliary power receiving devices 30. For example, the power transmitting device 10 supplies power to the power receiving devices 20 through contactless power supply using power transfer signals. Specifically, the contactless power supply system 1 wirelessly transfers power using a microwave method for contactless power supply. That is, the power transmitting device 10 and the power receiving devices 20 transmit and receive power transfer signals for contactless power supply between power receiving antennas of the power receiving devices 20 and the power transmitting antenna of the power transmitting device 10. The wireless power transfer method (contactless power transfer method) employed in this system is not limited to the microwave method, but may be an electromagnetic induction method, a magnetic field resonance method, an electric field resonance method, or a method using a laser. In the present embodiment, the transmission and reception of the power transfer signals are used for the contactless power supply. However, the wireless transmission and reception of the power transfer signals may be performed for purposes other than the contactless power supply. Each power receiving device 20 receives a power transfer signal transmitted from the power transmitting device 10, and operates with the received power or charges its own battery with the received power.

Among the auxiliary power receiving devices 30, the auxiliary power receiving devices 30 present on the path of the power transfer signal transmitted from the power transmitting device 10 to a power receiving device 20 receive the power transfer signal and notify the user of the reception. The user refers to the notification from the auxiliary power receiving devices 30 and checks the presence or absence of the power transfer signal.

[Configuration of Auxiliary Power Receiving Device 30]

Figure 2:
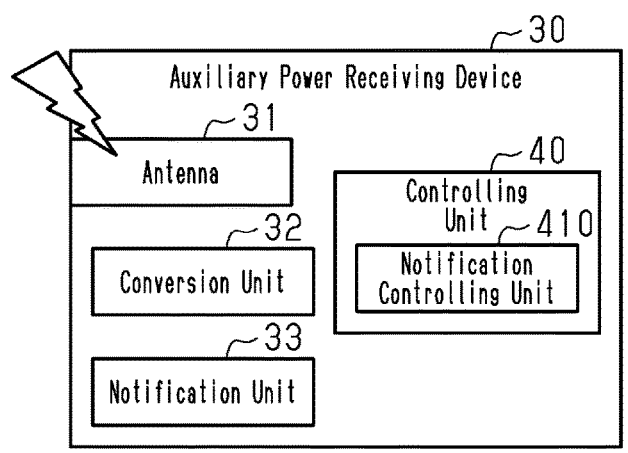
FIG. 2 is a diagram showing one example of an auxiliary power receiving device.

The configuration of the auxiliary power receiving device 30 will now be described. As shown in FIG. 2, the auxiliary power receiving device 30 includes, for example, an antenna 31, a conversion unit 32, a notification unit 33, and a controlling unit 40.

The antenna 31 is used to receive a power transfer signal. The conversion unit 32 converts the power transfer signal received by the antenna 31 into direct-current power. When the power transfer signal is received by the antenna 31, the notification unit 33 notifies the user of the reception. In the following description, the notification unit 33 includes a light emitting diode (LED). The LED is an example of a light emitting unit. The auxiliary power receiving device 30 turns on the notification unit 33 with the power converted by the conversion unit 32.

The antenna 31 is an example of a power receiving unit. The antenna 31 receiving a power transfer signal transmitted to a power receiving device 20 by the power transmitting device 10 is an example of an action of receiving power from a power transfer signal that is used to supply power to a power receiving device from a power transmitting device.

The controlling unit 40 controls each unit included in the power transmitting device 10. The controlling unit 40 may include circuitry including a hardware processor such as a central processing unit (CPU) configured to execute computer programs (software). Some or all of the constituent elements of the circuitry may be implemented by hardware such as a large scale integration (LSI), an application specific integrated circuit (ASIC), a field-programmable gate array (FPGA), or a graphics processing unit (GPU), or may be implemented by cooperation of software and hardware. The programs may be stored in advance in a storage device (not shown) including a non-transitory storage medium such as a hard disk drive (HDD) or a flash memory in the auxiliary power receiving device 30.

The controlling unit 40 includes, for example, a notification controlling unit 410. The notification controlling unit 410 may include circuitry including a hardware processor such as a central processing unit (CPU) configured to execute computer programs (software). The notification controlling unit 410 controls notification performed by the notification unit 33 in accordance with the reception condition of a power transfer signal at the antenna 31. The notification controlling unit 410 turns on the notification unit 33 when a power transfer signal is received by the antenna 31. The notification controlling unit 410 turns off the notification unit 33 when no power transfer signal is received by the antenna 31.

Installation Example of Auxiliary Power Receiving Devices 30

Figure 3:
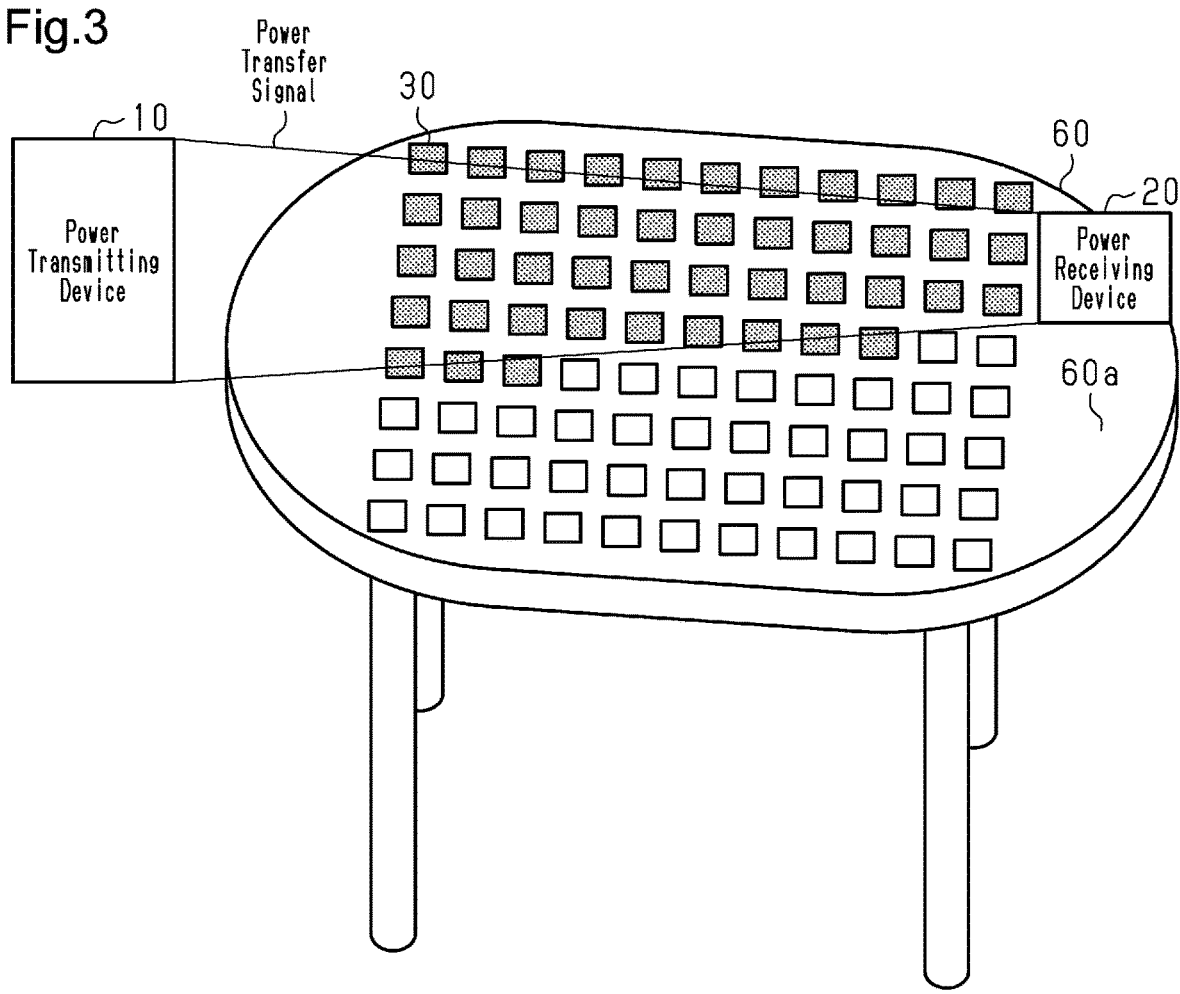
FIG. 3 is an example of auxiliary power receiving devices placed on a table.

An installation example of the auxiliary power receiving devices 30 will now be described. In a configuration including a plate-shaped member, multiple auxiliary power receiving devices 30 are provided on a main surface of the plate-shaped member as shown in FIG. 3. In the following description, the configuration including a plate-shaped member is a table 60, and a surface 60a of the table 60 is a main surface of the plate-shaped member. The notification units 33 of the auxiliary power receiving devices 30 are provided on the surface 60a of the table 60.

In the example shown in FIG. 3, multiple auxiliary power receiving devices 30 are provided at predetermined intervals on the surface 60a of the table 60. Among the auxiliary power receiving devices 30 on the surface 60a, the auxiliary power receiving devices 30 that have received a power transfer signal transmitted from the power transmitting device 10 to a power receiving device 20 turn on the notification units 33 to notify the user of the reception. Also, among the auxiliary power receiving devices 30, the auxiliary power receiving devices 30 that have not received the power transfer signal transmitted from the power transmitting device 10 to the power receiving device 20 do not turn on the notification units 33 so as not to notify the user of the reception.

[Operation Flow]

Figure 4:
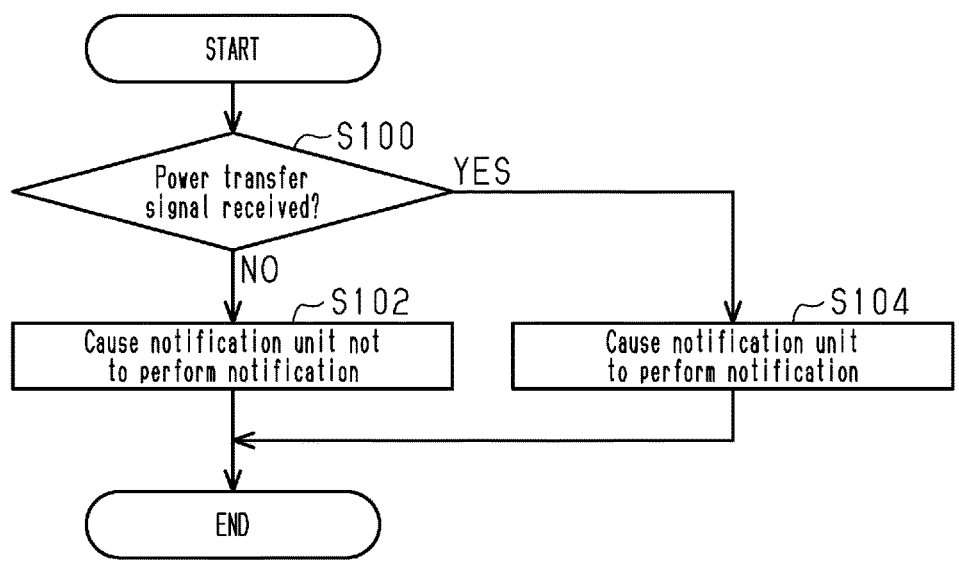
FIG. 4 is a flowchart showing one example of operation of an auxiliary power receiving device.

The process performed by the notification controlling unit 410 will now be described with reference to FIG. 4. First, the notification controlling unit 410 determines whether the antenna 31 has received a power transfer signal (step S100). When determining that the antenna 31 has not received a power transfer signal, the notification controlling unit 410 does not cause the notification unit 33 to perform notification regarding reception of a power transfer signal (step S102). Specifically, the notification controlling unit 410 turns off the notification unit 33. When determining that the antenna 31 has received a power transfer signal, the notification controlling unit 410 causes the notification unit 33 to perform notification regarding the reception of the power transfer signal (step S104). Specifically, the notification controlling unit 410 turns on the notification unit 33.

Operational Advantages of Embodiment

The above-described embodiment has the following operational advantages.

(1) Each auxiliary power receiving device 30 includes the antenna 31, the notification unit 33, and the notification controlling unit 410. The antenna 31 receives power from a power transfer signal, which is used to supply power from the power transmitting device 10 to the power receiving device 20. The notification units 33 are provided on the surface 60a of the table 60. The notification controlling unit 410 controls the notification performed by the notification unit 33 in accordance with the power reception condition of the power transfer signal at the antenna 31.

When the antenna 31 has received a power transfer signal, the notification controlling unit 410 of the present embodiment causes the notification unit 33 to perform notification regarding the reception of the power transfer signal. When the antenna 31 has not received a power transfer signal, the notification controlling unit 410 does not cause the notification unit 33 to perform notification regarding reception of a power transfer signal. This configuration allows the auxiliary power receiving device 30 to notify the user of the presence or absence of a power transfer signal.

(2) In a case in which multiple auxiliary power receiving devices 30 are provided on the surface 60a of the table 60, the notification units 33 may be provided on the surface 60a of the table 60. This configuration allows the auxiliary power receiving devices 30 to notify the user of the positions at which a power transfer signal has been received on the surface 60a of the table 60.

(3) The notification unit 33 is implemented by a light emitting unit such as an LED. This configuration allows the auxiliary power receiving device 30 to visually notify the user of the reception of a power transfer signal.

The above-described embodiment may be modified as follows. The above-described embodiment and the following modifications can be combined as long as the combined modifications remain technically consistent with each other.

In the above-described embodiment, when the antenna 31 has not received a power transfer signal, the notification controlling unit 410 does not cause the notification unit 33 to perform notification regarding reception of a power transfer signal. However, the present disclosure is not limited thereto. The notification controlling unit 410 may cause the notification unit 33 to perform notification regarding the fact that the antenna 31 has not received a power transfer signal in a manner different from a case in which the antenna 31 has received a power transfer signal. For example, the notification controlling unit 410 may turn on the notification unit 33 in blue when notifying the user that the antenna 31 has received a power transfer signal, and may turn on the notification unit 33 in red when notifying the user that the antenna 31 has not received a power transfer signal.

In the above-described embodiment, the notification unit 33 includes an LED. However, the present disclosure is not limited to this. The notification unit 33 may be implemented by, for example, a displaying unit, an audio output unit, a vibration unit, or a communication unit.

When the notification unit 33 is implemented by an audio output unit such as a speaker, the notification controlling unit 410 notifies the user that the antenna 31 has received a power transfer signal by causing the notification unit 33 to output a notification sound, a notification message, or the like. Also, the notification controlling unit 410 notifies the user that the antenna 31 has not received a power transfer signal by causing or not causing the notification unit 33 to output a notification sound, a notification message, or the like. This configuration allows the auxiliary power receiving device 30 to notify the user of the reception of a power transfer signal.

When the notification unit 33 is implemented by a displaying unit such as a display, the notification controlling unit 410 notifies the user that the antenna 31 has received a power transfer signal by causing the notification unit 33 to display a notification message, a notification image, or the like. Also, the notification controlling unit 410 notifies the user that the antenna 31 has not received a power transfer signal by causing or not causing the notification unit 33 to display a notification message, a notification image, or the like. This configuration allows the auxiliary power receiving device 30 to visually notify the user of the reception of a power transfer signal.

When the notification unit 33 is implemented by a vibration unit such as a motor, the notification controlling unit 410 notifies the user that the antenna 31 has received a power transfer signal by causing the notification unit 33 to vibrate. Also, the notification controlling unit 410 notifies the user that the antenna 31 has not received a power transfer signal by causing the notification unit 33 to vibrate in a manner different from a case in which the antenna 31 has received a power transfer signal or by not causing the notification unit 33 to vibrate. This configuration allows the auxiliary power receiving device 30 to haptically notify the user of the reception of a power transfer signal.

When the notification unit 33 is implemented by a communication unit or the like, the notification controlling unit 410 notifies the user of information indicating that a power transfer signal has been received by causing the notification unit 33 to transmit the information to the power receiving device 20 connected to the auxiliary power receiving device 30 via a network. The network that connects the auxiliary power receiving device 30 and the power receiving device 20 to each other is implemented by, for example, Bluetooth (registered trademark), Wi-Fi, or ZigBee (registered trademark). The notification controlling unit 410 notifies the user of information indicating that a power transfer signal has not been received by causing or by not causing the notification unit 33 to transmit the information to the power receiving device 20 connected to the auxiliary power receiving device 30 via the network. The power receiving device 20 itself may be connected to the auxiliary power receiving device 30 via the network. Alternatively, a terminal device in which the power receiving device 20 is mounted may be connected to the auxiliary power receiving device 30 via the network. The terminal device may be, for example, a smart-phone, a tablet terminal, or a personal computer. This configuration allows the auxiliary power receiving device 30 to visually notify the user of the reception of a power transfer signal using information such as a message. In addition, when the power receiving device 20 or a terminal device in which the power receiving device 20 is mounted has a visual, audible, or tactile configuration for notifying the user that information has been received, it is possible to notify the user that a power transfer signal has been received in a visual, audible, or haptic manner.

Figure 5:
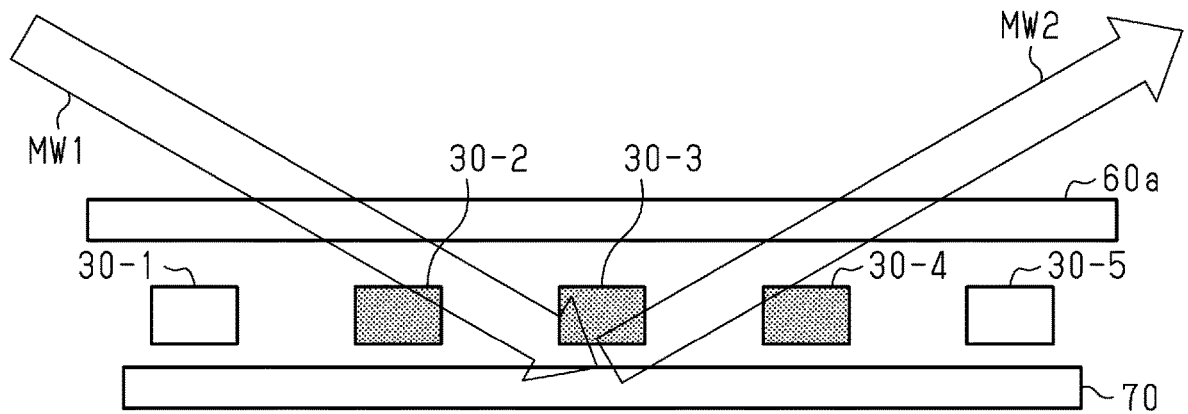
FIG. 5 is a diagram illustrating one example of a power transfer signal reflected by a reflection member.

In the above-described embodiment, the notification units 33 are provided on the surface 60a of the table 60. However, the present disclosure is not limited thereto. As shown in FIG. 5, the notification units 33 may be provided between a metallic reflection member 70 provided in the transmission path of a power transfer signal and the surface 60a. When the notification unit 33 is implemented by a unit that visually notifies the user, the surface 60a is formed by a member that is transparent to visible light. When the notification unit 33 is implemented by a unit that audibly notifies the user, the surface 60a is formed by a member that does not hinder or hardly hinders propagation of vibration accompanying the output of sound from the notification unit 33. When the notification unit 33 is implemented by a unit that haptically notifies the user, the surface 60a is formed by a member that does not hinder or hardly hinders propagation of vibration of the notification unit 33.

The reflection member 70 reflects a power transfer signal. In the example illustrated in FIG. 5, among multiple auxiliary power receiving devices 30-1 to 30-5, the auxiliary power receiving devices 30-2, 30-3 receive an incident signal MW1 of a power transfer signal transmitted to the power receiving device 20 from the power transmitting device 10. Also, among the auxiliary power receiving devices 30-1 to 30-5, the auxiliary power receiving devices 30-3, 30-4 receive a reflected signal MW2 of the power transfer signal transmitted to the power receiving device 20 from the power transmitting device 10. Accordingly, among the power receiving devices 30-1 to 30-5, the notification controlling units 410 of the auxiliary power receiving devices 30-2, 30-3 cause the notification units 33 to notify the user that the power receiving devices 30-2, 30-3 have received the power transfer signal. Also, among the power receiving devices 30-1 to 30-5, the notification controlling units 410 of the auxiliary power receiving devices 30-3, 30-4 cause the notification units 33 to notify the user that the power transfer signal has been reflected. This configuration allows the auxiliary power receiving devices 30 to notify the user of the positions at which the power transfer signal has been received and the position where the power transfer signal has been reflected.

Figure 6:
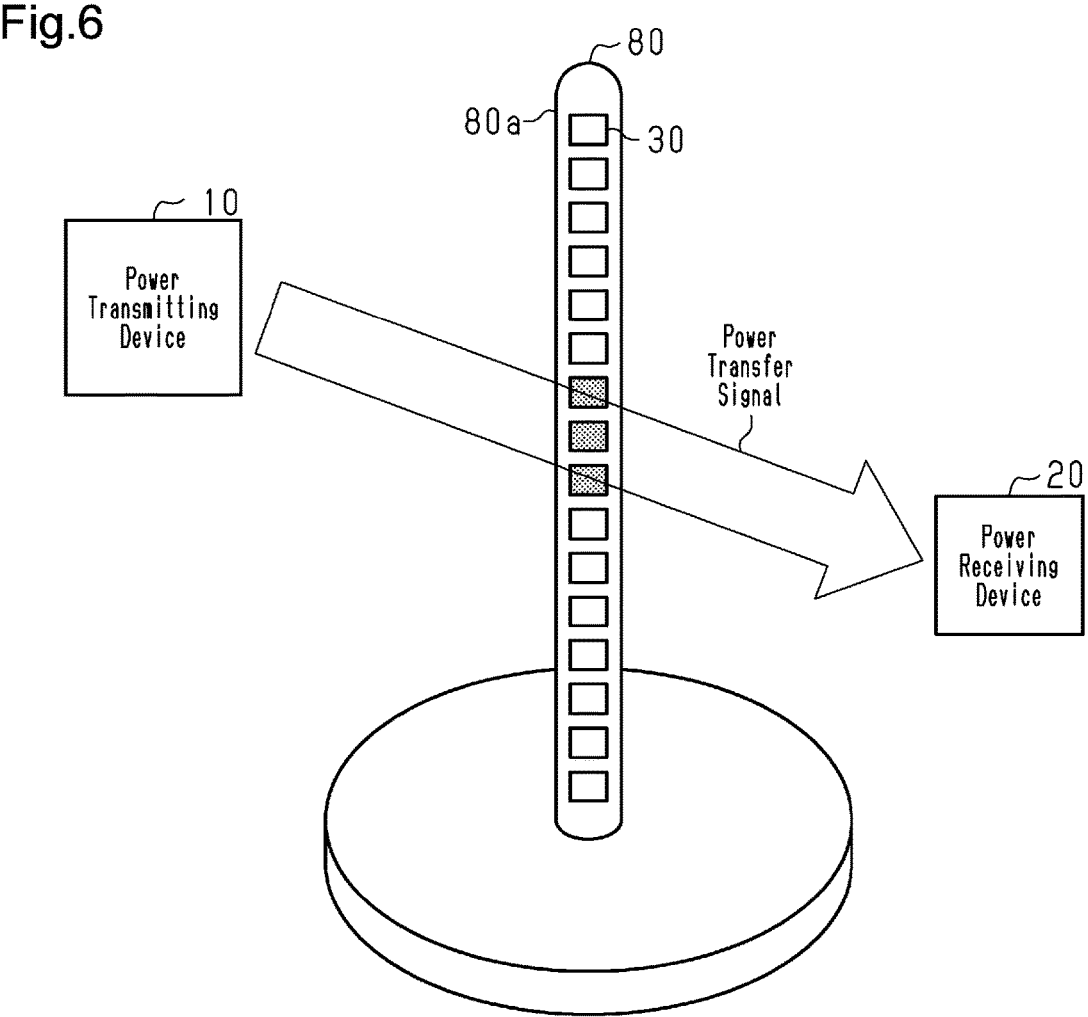
FIG. 6 is an example of auxiliary power receiving devices placed on a stand.

In the above-described embodiment, the notification units 33 are provided on the surface 60a of the table 60. However, the present disclosure is not limited thereto. As illustrated in FIG. 6, notification units 33 may be provided on a surface 80a of a structure such as a stand 80 that can be vertically installed on the ground. This configuration allows the auxiliary power receiving devices 30 to notify the user of the positions at which a power transfer signal has been received in the vertical direction. The surface 80*a* is an example of a main surface of a plate-shaped member.

In the above-described embodiment, each auxiliary power receiving device 30 includes one antenna 31 and one notification unit 33. However, the present disclosure is not limited to this. Each auxiliary power receiving device 30 may include two or more antennas 31 and two or more notification units 33. An auxiliary power receiving device 30*a*, which includes multiple notification units 33, will now be described with reference to FIG. 7. The auxiliary power receiving device 30*a* includes an antenna 31, a conversion unit 32, four notification units 33-1 to 33-4, and a controlling unit 40. The antenna 31 is provided at a position corresponding to a position at which the notification units 33 are provided. Specifically, the antenna 31 is located in the middle of the notification units 33-1 to 33-4. When the antenna 31 has received a power transfer signal, the notification controlling unit 410 of the auxiliary power receiving device 30*a* causes the notification units 33-1 to 33-4 to perform notification regarding the reception of the power transfer signal. This configuration allows the auxiliary power receiving device 30*a* to notify the user of the reception of the power transfer signal in an easy-to-understand manner in a wider range than in a case in which only one notification unit 33 is provided.

An auxiliary power receiving device 30*b* includes four antennas 31-1 to 31-4, a conversion unit 32, a notification unit 33, and a controlling unit 40. The conversion unit 32 is provided at a position corresponding to a position at which the antennas 31 are provided. Specifically, the notification unit 33 is located in the middle of the antennas 31-1 to 31-4. When any of the antennas 31-1 to 31-4 has received a power transfer signal, the notification controlling unit 410 of the auxiliary power receiving device 30*a* causes the notification unit 33 to perform notification regarding the reception of the power transfer signal. This configuration allows the auxiliary power receiving device 30*b* to detect whether a power transfer signal has been received in a wider range than in a case in which one antenna 31 is provided.

The notification units 33 of the auxiliary power receiving devices 30 or the notification units 33 in the auxiliary power receiving device 30*a* may be provided at predetermined intervals on the surface 60*a*. Also, the notification units 33 of the auxiliary power receiving devices 30 or the notification units 33 in the auxiliary power receiving device 30*a* may be provided at predetermined intervals on the surface 80*a*. This configuration allows the auxiliary power receiving devices 30 or the auxiliary power receiving device 30*a* to notify the user of the presence or absence of a power transfer signal in a uniform manner on the surface on which the notification units 33 are provided.

The notification units 33 of the auxiliary power receiving devices 30 or the notification units 33 in the auxiliary power receiving device 30*a* do not necessarily need to be provided on the surface 60*a* of the table 60 or the surface 80*a* of the stand 80, but may be provided on a surface of a structure such as a wall, a ceiling, or a floor that define a space in which the contactless power supply system 1 is provided. A surface of a structure such as a wall, a ceiling, or a floor is an example of a main surface of a plate-shaped member. The notification units 33 of the auxiliary power receiving devices 30 or the notification units 33 in the auxiliary power receiving device 30*a* are provided at predetermined intervals on the surface of, for example, a wall, a ceiling, or a floor. This configuration allows the auxiliary power receiving devices 30 or the auxiliary power receiving device 30*a* to notify the user of the presence or absence of a power transfer signal in a uniform manner on the surface on which the notification units 33 are provided.

When the notification units 33 of the auxiliary power receiving devices 30 or the notification units 33 in the auxiliary power receiving device 30*a* are provided horizontally at predetermined intervals on a wall surface, it is possible to notify the user of the position at which the power transfer signal has been received in a horizontal direction. When the notification units 33 of the auxiliary power receiving devices 30 or the notification units 33 in the auxiliary power receiving device 30*a* are provided vertically at predetermined intervals on a wall surface, it is possible to notify the user of the position at which the power transfer signal has been received in a vertical direction.

The notification controlling unit 410 may change the notification mode of the notification unit 33 according to the reception strength of the power transfer signal received by the antenna 31. For example, the notification controlling unit 410 may increase the intensity of notification as the reception strength of the power transfer signal received by the antenna 31 increases, and may decrease the intensity of notification as the reception strength of the power transfer signal received by the antenna 31 decreases.

For example, when the notification unit 33 is implemented by an audio output unit such as a speaker, the notification controlling unit 410 notifies the user with a higher volume as the reception strength increases, and notifies the user with a lower volume as the reception strength decreases. When the notification unit 33 is implemented by a displaying unit such as display, the notification controlling unit 410 notifies the user with a notification message or a notification image in a more noticeable mode as the reception strength increases, and notifies the user with a notification message or a notification image in a less noticeable mode as the reception strength decreases. When the notification unit 33 is implemented by a vibration unit such as a motor, the notification controlling unit 410 notifies the user with stronger vibration as the reception strength increases, and notifies the user with weaker vibration as the reception strength decreases. When the notification unit 33 is implemented by a communication unit or the like, the notification controlling unit 410 notifies the user with information in a more noticeable mode as the reception strength increases, and notifies the user with information in a less noticeable mode as the reception strength decreases.

In addition, the notification controlling unit 410 may perform notification at a higher frequency as the reception strength increases, and may perform notification at a lower frequency as the reception strength decreases. This configuration allows the auxiliary power receiving device 30 to notify the user of the strength of a power transfer signal.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An auxiliary power receiving device, comprising:
   at least one power receiving unit configured to receive power from a power transfer microwave signal, which is used to supply power from a power transmitting device to a power receiving device;
   at least one notification unit configured to be provided on a main surface of a plate-shaped member; and
   a notification controlling unit configured to control a notification performed by the notification unit in accordance with a power reception condition of the power transfer microwave signal at the power receiving unit, wherein
   the at least one notification unit includes a plurality of notification units,
   each notification unit of the plurality of notification units:
      is provided on the main surface of the plate-shaped member, and
      includes a light emitting unit,
   the at least one power receiving unit includes a plurality of power receiving units,
   each power receiving unit of the plurality of power receiving units is provided at a position corresponding to a respective position at which at least one respective notification unit of the plurality of notification units is provided; and
   the notification controlling unit is configured to, for each power receiving unit,
      determine whether power is received at the power receiving unit, and in response to determining that power is received, turn on the light emitting unit of the at least one respective notification unit provided at the respective position corresponding to the position of the power receiving unit at which the power transfer microwave signal is received to notify a user that the power transfer microwave signal has been received by the power receiving unit.

2. The auxiliary power receiving device according to claim 1, wherein the notification controlling unit is configured to
   determine whether the power transfer microwave signal reflected by a metal reflection member provided on a transmission path of the power transfer microwave signal is received at at least one of the plurality of power receiving units,
   in response to determining that the reflected power transfer microwave signal is received, turn on the light emitting unit of the at least one notification unit located at positions corresponding to positions of the at least one of the plurality of power receiving units at which the reflected power transfer microwave signal is received to notify a user that the power transfer microwave signal has been received by the at least power receiving unit.

3. The auxiliary power receiving device according to claim 1, wherein the at least one notification unit is provided on a surface of a structure that is configured to be installed so as to extend vertically from the ground.

4. The auxiliary power receiving device according to claim 1, wherein the notification controlling unit is configured to change a notification mode of each notification unit of the plurality of notification units according to a strength of the power transfer microwave signal received by the corresponding at least one power receiving unit.

5. The auxiliary power receiving device according to claim 1, wherein the plurality of notification units are provided at intervals on the main surface of the plate-shaped member.

6. The auxiliary power receiving device according to claim 1, wherein each power receiving unit includes a power receiving antenna which receives power from the power transfer microwave signal.

7. The auxiliary power receiving device according to claim 1, the light emitting units being at least one light emitting diode.

8. The auxiliary power receiving device according to claim 1, further comprising at least one processor configured as the notification controlling unit.

9. The auxiliary power receiving device according to claim 1, wherein
   each power receiving unit includes a power receiving antenna which receives power from the power transfer microwave signal;
   each of the light emitting units is at least one light emitting diode; and
   further comprising at least one processor configured as the notification controlling unit.

10. The auxiliary power receiving device according to claim 1, wherein the notification controlling unit is further configured to, for each power receiving unit,
    in response to determining that power is not received, turn off the light emitting unit of the at least one respective notification unit provided at the respective position corresponding to the position of the power receiving unit at which the power transfer microwave signal is not received.

* * * * *